United States Patent Office 3,168,986
Patented Feb. 9, 1965

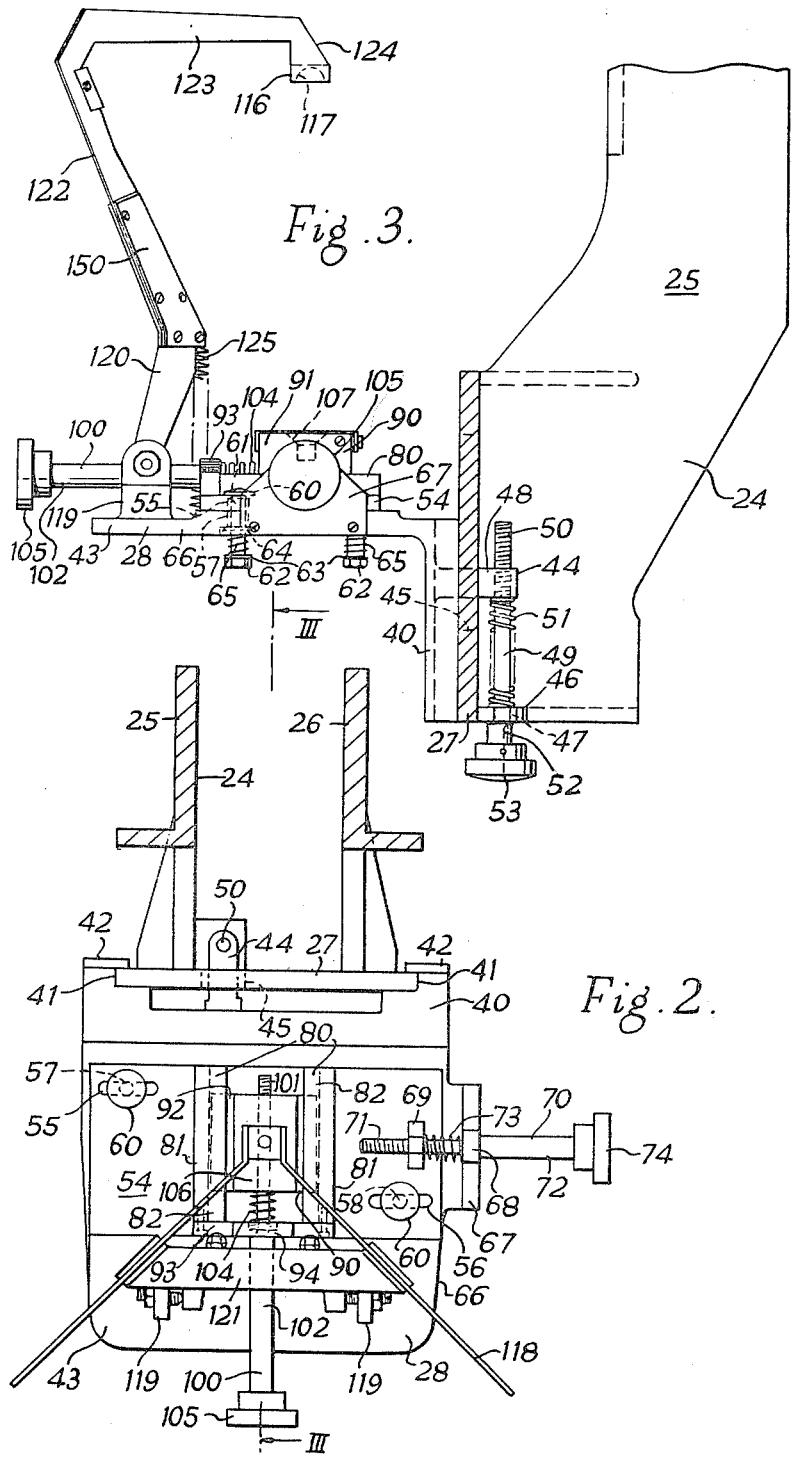

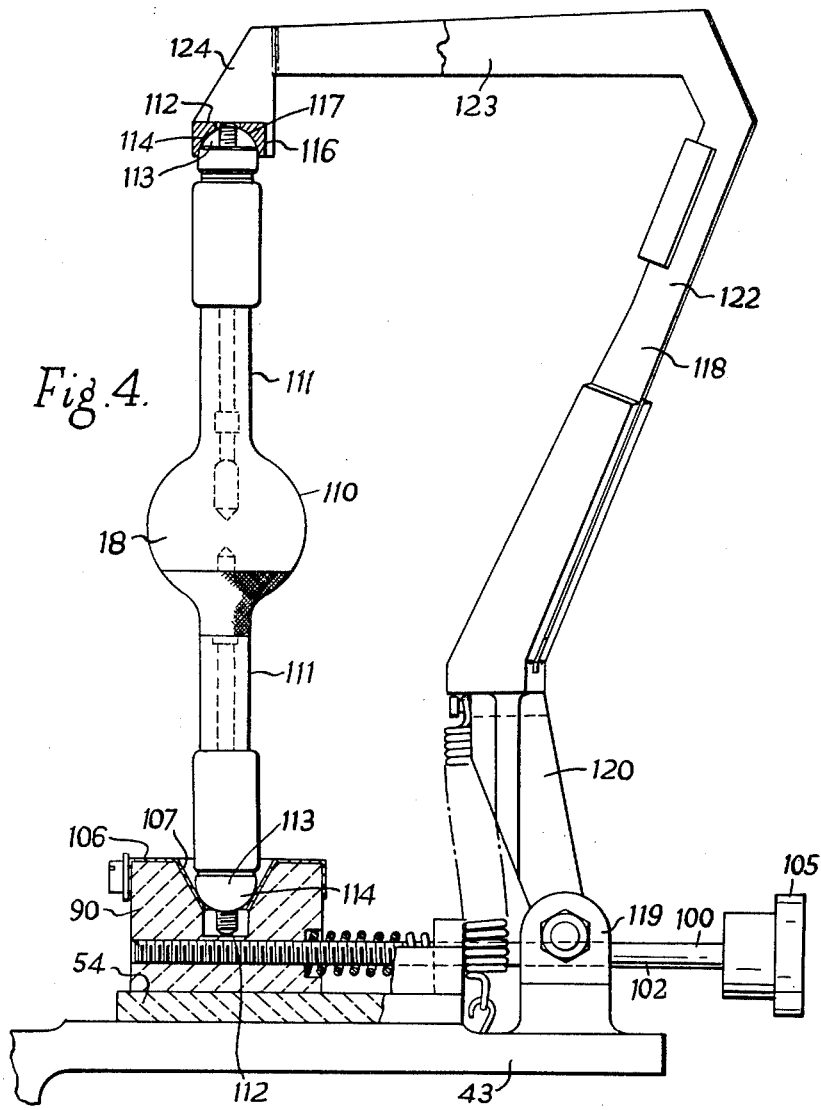

3,168,986
MOUNTINGS FOR ADJUSTING THE LOCATION OF A SOURCE OF LIGHT IN AN OPTICAL PATH
John Henry Jeffree, London, and Dennis Arthur Sutton, Hatfield, England, assignors to Caps (Research) Limited, Wembley, England
Filed Aug. 6, 1962, Ser. No. 215,024
Claims priority, application Great Britain, Aug. 4, 1961, 28,504/61
9 Claims. (Cl. 240—44.2)

This invention relates to mountings for adjusting the location of a source of light in an optical path.

In certain forms of optical apparatus it is important that the light source be accurately located in the optical path. When, for example, in the enlarger apparatus described in our co-pending patent application No. 59,908, now abandoned, a rectilinear mercury discharge in an ultra-violet lamp is used as the light source, consistency of results requires that the discharge be aligned on the optical axis of the enlarger. Owing to manufacturers tolerances the positions of the discharge formed by different lamps varies slightly and it is an object of this invention to compensate for this variation.

According to the present invention, a mounting for adjusting the location of a source of light in an optical path comprises a bracket having a first fixed part and a second part extending in a plane normal to the optical path, an element mounted on the second part of the bracket for engaging means adapted to provide a light source and first and second adjustment means for adjusting the position of the element on the second part of the bracket in respective directions mutually at right angles.

It will be appreciated, therefore, that the element of the mounting which engages the light source is adjustable in two directions at right angles and can therefore be moved so as to bring the light source, say, for example, a rectilinear mercury discharge, into or substantially into alignment with the optical axis of the apparatus in which the mounting is employed.

Preferably, the first part of the bracket is disposed at right angles to the second part thereof and is carried on an elongated support and means are provided for adjusting the position of the first part of the bracket relative to its support in a direction parallel with the optical path. Accordingly, provision is made for moving the light source lengthwise with respect to the optical axis.

The invention will now be described, by way of example, with reference to the accompanying drawings, in which:

FIGURE 2 is a view of certain parts of the enlarger taken on the line II—II of FIGURE 1;

FIGURE 3 is a view taken on the line III—III of FIGURE 2; and

FIGURE 4 is a side elevational view partly in section illustrating the mounting of the ultra-violet lamp of the enlarger.

Figure 1:
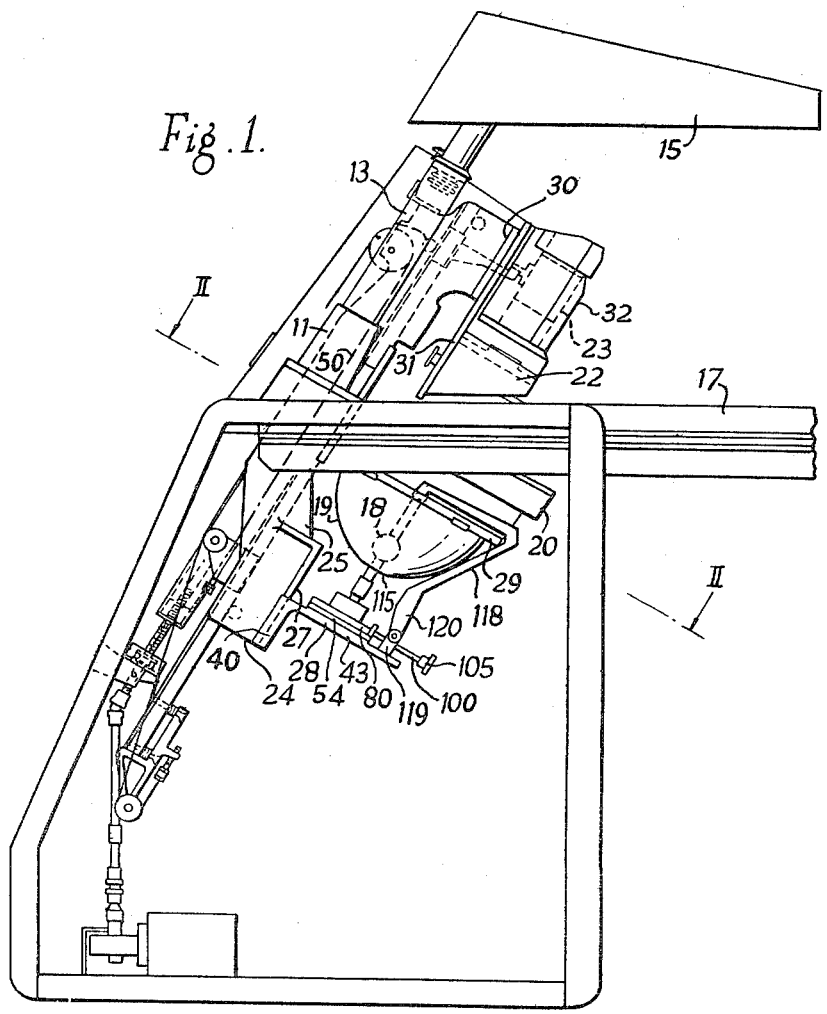
FIGURE 1 is a side elevation of a micro-film enlarger incorporating the present invention.

Referring to the drawings, the micro-film enlarger therein illustrated is generally similar to the enlarger described in co-pending patent application No. 59,908 now abandoned and comprises a framework supporting two parallel fixed tubes, such as the tube 11, inclined forwardly at an angle of 30° to the vertical direction and within which slide respective tubes, such as the tube 13, which carry on their upper ends a hood 15 within which is mounted a flat mirror (not shown) inclined upwardly and rearwardly from its front edge at an angle of 15° to the horizontal direction. 17 is a fixed viewing or printing bed of the enlarger. 18 is an ultra-violet mercury discharge lamp, 19 a reflector, 20 a heat filter and 22 represents generally a gate which incorporates a condenser lens and gate lens whilst 23 represents generally the magnifying lens system of the enlarger. Between the gate and the heat filter is provided a shutter mechanism (not shown). The lens system 23 and gate 22 are generally of the form described in our co-pending patent application No. 59,908, now abandoned.

The flat mirror in the hood 15 serves to reflect vertically downwards an image on the bed 17. It will be apparent, therefore, that as the optical axis of the enlarger in advance of the flat mirror, as hereinafter described, extends parallel with the tube 13, movement of the mirror varies the length of the optical path, any actual movement of the mirror being directly proportional to the change in length of the optical path.

The lamp 18, reflector 19, heat filter 20, gate 22 and lens 23 are aligned on the optical axis of the enlarger which extends upwardly and forwardly at an inclination of 30° to the vertical, i.e. parallel to the tube 13. To this end, the enlarger includes a main spine 24 fixed to the framework and extending upwardly and forwardly at an inclination of 30° to the vertical. The spine 24 consists of mutually spaced parallel side plates 25 and 26 which at their lower edge are connected by a plate 27, the latter carrying an adjustable bracket 28 on which the lamp 18 is mounted, as hereinafter described. The upper rim of the reflector 19 is carried in a support 29 which in turn is secured to the forward edges of the plates 25 and 26. The heat filter 20 is likewise mounted on the front edges of the plates 25 and 26.

Upper parts 30 of the front edges of the plates 25 and 26 pendently carry a plate 31 on a lower portion of which is mounted the gate 22 whilst on an upper portion of the plate 31 is carried a housing 32 of the lens 23.

The bracket 28, which comprises the mounting for the lower end of the lamp 18, has a first part 40 which engages outer upright edges of the plate 27, the outer upright edges of the plate 27 serving as parallel guides along which the bracket can slide so as to move the lamp 18 along the length of the optical axis of the enlarger. To maintain engagement between the part 40 and the plate 27, the part 40 is formed with a recess 41 within which the plate 27 is engaged and plates 42 bolted to the rear face of the part 40 serve to retain the part 40 on the plate 27 for movement in a direction parallel with the optical axis of the enlarger.

A second part or platform 43 of the bracket 28 extends at right angles to the first part 40 thereof. The first part 40 of the bracket is formed with a rearwardly extending abutment 44 which projects rearwardly through a slot 45 in the plate 27, the slot 45 extending in an upright direction parallel with the upright side edges of the plate 27. At the lower end of the plate 27 is formed an abutment 46 which is disposed in alignment with the abutment 44 on the part 40 of the bracket. The abutment 46 is formed with a plain bore 47 which is co-axial with an internally threaded bore 48 in the abutment 44. A shaft 49 threaded over an upper part of its length 50 projects through the plain bore 47 in the abutment 46 and co-operates with the threaded bore 48 in the abutment 44.

Mounted on the shaft 49 is a helical compression spring 51 which at its ends abuts respectively the abutments 44 and 46. The spring 51 serves to maintain a shoulder 52 on the shaft 49 in contact with the lower face of the abutment 46. It will be appreciated, therefore, that the height of the bracket 28 relative to the plate 27 is maintained by the spring 51. Rotation of the shaft 49 effects raising or lowering of the bracket 28 relative to the plate 27 and such rotation of the shaft is facilitated by means of a knob 53 carried on the lower end of the shaft.

The platform 43 of the bracket carries an asbestos plate 54 which is rectangular in plan view and which is formed with parallel slots 55 and 56 extending parallel with the front edge of the platform 43. The slots 55 and 56 are mutually spaced apart in a direction extending from the rear of the platform 43 and also in a direction extending parallel with the front edge of the platform 43. The slots 55 and 56 overlie holes 57 and 58 formed in platform 43. Each of the holes 57 and 58 is formed with a part opening to the lower surface of the platform 43 of larger diameter. Studs 60 each have a shank 61 a lower portion of which is threaded. One of the shanks 61 passes through the slot 55 and corresponding hole 57 in the platform whilst the other shank 61 passes through the slot 56 and corresponding hole 58 in the platform. The threaded ends of the shanks 61 project below the platform 43 and carry nuts 62 at their lower ends. On each shank 61 between a washer 63 adjacent the nut 62 and a washer 64 disposed in the portion of each hole 57 and 58 of larger diameter is mounted a compression spring 65.

It will be appreciated that the plate 54 is biased into contact with the platform 43 by the force exerted by the compression spring 65 which force can be adjusted by movement of the nut 62. Also, the slots 55 and 56 permit side to side movement of the plate 54 relative to the platform 43. To effect this side to side movement, there is secured at a side 66 of the platform 43, which extends from front to rear of the platform, an upstanding abutment 67 formed with a plain hole 68. Aligned with the abutment 67, there is provided a further abutment 69 carried on the plate 54 and this latter abutment is formed with a threaded hole co-axial with the hole 68. A shaft 70, having an inner threaded part 71 and an outer unthreaded part 72 of larger diameter than the part 71, extends through the hole 68 and its inner part 71 co-operates with the threaded hole in the abutment 69, the shoulder formed between the parts 71 and 72 of the shaft 70 engaging the outer face of the abutment 67. Embracing the shaft 70 between the abutments 68 and 69 is a compression spring 73. Upon rotation of the shaft 70, by means of a knob 74 provided at the outer end thereof, movement of the plate 54 occurs in a direction from side to side of the platform 43.

Carried centrally on the plate 54 and extending in a direction from front to rear thereof are parallel fixed guides 80 each of which includes an upstanding portion 81 at the upper end of which is an inwardly projecting flange 82. Engaged in the guides 80 for movement in a direction from front to rear of the platform 43 is an insulated block 90 which has an upstanding portion 91 projecting above the guides 80 and at opposite sides thereof flanges 92 which engage beneath the inwardly projecting flanges 82.

For effecting movement of the block 90 in a direction from front to rear of the platform 43 along the guides 80, there is provided at the front of the guides 80 an upstanding projection 93 formed with a plain hole 94 co-axial with a threaded hole extending through the block 90 from front to rear thereof. A shaft 100, including a rear threaded portion 101 and a forward unthreaded portion 102 of larger diameter than the portion 101, extends through the hole 94 and its rear portion 101 co-operates with the threaded hole in the block 90. Embracing the shaft 100 and disposed between the abutment 93 and the block 90 is a compression spring 104 which urges the shoulder formed between the portions 101 and 102 of the shaft 100 into engagement with the forward face of the projection 93.

It will be apparent that rotation of the shaft 100 by means of a knob 105 carried at the forward end thereof effects movement of the block 90 in a direction from front to rear of the platform 43.

On the upper surface of the insulated block 90 is carried a metal plate 106 which is formed centrally thereof with a conical surface 107 comprising an electrical contact, as hereinafter described, for the ultra-violet mercury discharge lamp 18.

It will be apparent, therefore, that the insulated block 90 can be moved by the knobs 74 and 105 in two directions which are at right angles in the plane of the platform 43 whilst adjustment of the bracket by movement of the knob 53 effects movement of the platform 43 in a direction lengthwise of the optical axis. As hereinafter described, when a mercury discharge lamp is disposed lengthwise with respect to the optical axis and engaged at one end thereof in contact with the plate 106, the substantial linear discharge of the lamp can be brought by appropriate adjustment of the knobs 74 and 105 into or substantially into alignment with the optical axis of the enlarger. Also, by adjustment of the knob 53 the discharge of the lamp can be accurately positioned relative to the reflector 19.

The commercially available form of ultra-violet mercury discharge lamp employed comprises a glass bulb 110 having, on opposite sides thereof, coaxially projecting tubular portions 111 each of which terminates in an electrical connection comprising an axially projecting screw-threaded member 112. These screw-threaded members 112 render removal and replacement of the lamp somewhat difficult. Accordingly, to facilitate removal and replacement of the lamp each screw-threaded member has provided thereon a fitting 113 formed with a part-spherical surface 114. The fitting 113 at the lower end of the lamp engages the conical surface 107 of the plate 106. The lamp extends substantially co-axially with the optical axis of the enlarger through a central aperture 115 at the bottom of the reflector 19, and at its upper end the corresponding fitting 113 is engaged in a metal block 116 formed with a part-spherical surface 117 complementary with the part-spherical surface 114 of the co-operating fitting 113.

The block 116 is carried on a swing arm structure 118 which is pivotally mounted on the platform 43. To this end, the platform 43 is formed on opposite sides of the location of the shaft 100 with upstanding apertured lugs 119 in which lower arm parts 120 of the swing arm structure are pivotally mounted. Upper ends of the lower arm parts 120 are connected by a transverse beam 121 from opposite ends of which project upwardly and forwardly intermediate arm parts 122 of the swing arm structure. The intermediate arm parts of the swing arm structure extend alongside the reflector 19 to a point above the upper rim thereof. From the upper ends of the intermediate arm parts 122 there extend radially inwardly with respect to the upper rim of the reflector 19, upper arm parts 123 which at their inner ends terminate in depending parts 124 secured on opposite sides of the block 116. The lower ends of the intermediate arm parts 122 are electrically separate from the beam 121. To this end, the lower ends of the intermediate arm parts 122 are connected to the ends of the beam 121 by insulating strips 150. Electrical conductors (not shown) connect respectively with the plate 106 and the intermediate portions 122 of the swing arm structure for the purpose of connecting an appropriate electrical supply with the lamp.

Parallel coil springs, such as the spring 125, bias the swing arm structure to a position in which the part-spherical surface 117 of the block 116 is disposed substantially co-axially with the conical surface 107 of the plate 106 on the block 90. For this purpose, the parallel springs are connected at opposite ends thereof respectively to the beam 121 and the platform 43.

In order to change the ultra-violet lamp in the apparatus the swing arm structure is rotated against the action of biassing springs 125 about its pivotal connection with the bracket platform 43 whereupon the lamp can be removed. A new lamp provided with appropriate fittings 113 is then inserted in the plate 106 at its lower end in the conical surface 107, whereupon the swing arm structure is returned to its initial position so that the surface 117 engages the upper fitting 113 of the new lamp.

We claim:

1. A microfilm enlarger, comprising a lamp having coaxial spaced electrical connections, a lamp supporting bracket, an element mounted on the bracket, contact means provided on the element and in engagement with one of the said electrical connections, a swing arm structure pivotally mounted on the bracket, further contact means carried on the swing arm structure remotely from the element and in engagement with the other of the said electrical connections, the swing arm structure being movable from an operative position in which the further contact means are positioned coaxial with the contact means on the element and are in engagement with the other of the said electrical connections to a withdrawn position in which the lamp can be removed from its supported position on the element, an image bed, an optical system defining an optical path along which light from the lamp is projected to form an image of the microfilm on the image bed, and first and second adjustment means for adjusting the position of the element relative to the optical path in respective mutually perpendicular directions in a plane normal to the said optical path.

2. A microfilm enlarger as claimed in claim 1, wherein the element is formed of an electrically insulating material.

3. A microfilm enlarger as claimed in claim 1, wherein the electrical connections on the lamp include respective part-spherical surfaces which engage complementary surfaces on the element and the contact means carried by the swing arm structure whereby disengagement of the lamp from both the swing arm structure and the element is facilitated.

4. A microfilm enlarger as set forth in claim 1 wherein the lamp supporting bracket comprises a first fixed part, and a second part which extends in a plane normal to the optical path and upon which the said element is mounted.

5. A microfilm enlarger as claimed in claim 4, wherein the first part of the bracket is disposed at right angles to the second part thereof and is carried on an elongated support and means are provided for adjusting the position of the first part of the bracket relative to its support in a direction parallel with the optical path.

6. A microfilm enlarger as claimed in claim 5, wherein the means for adjusting the first part of the bracket relative to the elongated support comprise an abutment on the support, an abutment on the bracket and a shaft so co-operating with the abutments that rotation of the shaft effects movement of the first part of the bracket relative to its support.

7. A microfilm enlarger as claimed in claim 6, wherein the abutment of the support is formed with a plain hole, the abutment of the bracket is formed with a threaded hole and the shaft extends through the plain hole and includes a threaded part which co-operates with the threaded hole, there being provided a compression spring disposed on the shaft which at its ends engages the abutments and serves to maintain a shoulder on the shaft in contact with the face of the abutment on the support remote from the abutment on the bracket.

8. A mounting as set forth in claim 4 wherein the first adjustment means for adjusting the position of the element on the second part of the bracket comprise a plate carried on the second part of the bracket and constrained for movement in a direction from side to side with respect to the second part of the bracket, the plate having an upstanding projection formed with an internally threaded hole whilst the second part of the bracket has, on a side edge thereof, an upstanding projection formed with a plain hole, there being provided a shaft rotation of which effects movement of the plate relative to the bracket and which extends through the plain hole and includes a threaded part co-operating with the threaded hole and further provided is a compression spring which at its ends engages the projections and serves to maintain a shoulder on the shaft in contact with the face of the bracket projection remote from the projection on the plate.

9. A microfilm enlarger as claimed in claim 8, wherein the second adjustment means for adjusting the position of the element on the plate comprise two parallel guides extending from front to rear of the plate between which is engaged the element, an upstanding abutment on the plate at one end of the guides this abutment being formed with a plain hole, an internally threaded hole in the element extending from front to rear thereof in a direction parallel with the guides, a shaft which extends through the plain hole and engages the threaded hole, and a compression spring between the element and the abutment on the plate which serves to maintain a shoulder on the shaft in contact with the face of the abutment remote from the element.

References Cited by the Examiner

UNITED STATES PATENTS

| 363,500 | 5/87 | Anderson | 339—52 X |
|---|---|---|---|
| 1,282,224 | 10/18 | Hardyman | 240—44 |
| 1,650,657 | 11/27 | Schwanhausser | 240—44 X |
| 1,735,451 | 11/29 | Coulter | 240—44.2 |

FOREIGN PATENTS 481,072  3/27  Germany.

NORTON ANSHER, *Primary Examiner.*

EVON C. BLUNK, *Examiner.*